United States Patent [19]
Prior

[11] Patent Number: 5,051,186
[45] Date of Patent: Sep. 24, 1991

[54] METHOD OF PROCESSING ACIDIC FE-CONTAINING SOLUTIONS

[75] Inventor: Adalbert Prior, Götzis, Austria

[73] Assignee: Prior Engineering AG, Zürich, Switzerland

[21] Appl. No.: 474,452

[22] Filed: Feb. 2, 1990

[30] Foreign Application Priority Data

Feb. 6, 1989 [AT] Austria ................................ 231/89

[51] Int. Cl.⁵ ............................................. B01D 11/04
[52] U.S. Cl. ................................... 210/638; 210/651; 423/139; 423/DIG. 14
[58] Field of Search ............... 210/634, 638, 639, 651; 423/139, DIG. 14

[56] References Cited

U.S. PATENT DOCUMENTS 4,582,691  4/1986  Fujimoto et al. .................... 210/638
4,678,655  7/1987  Twardowski ....................... 210/639

FOREIGN PATENT DOCUMENTS 0058148  10/1981  European Pat. Off. .
1621577   1/1966  Fed. Rep. of Germany .
 353072   7/1976  Fed. Rep. of Germany .
81/00728  3/1981  PCT Int'l Appl. .

Primary Examiner—Ivars Cintins
Attorney, Agent, or Firm—Townsend and Townsend

[57] ABSTRACT

A method of processing acidic Fe-containing solutions, in particular spent (discarded) pickling solutions, by liquid/liquid extraction with organic ion exchangers wherein the solutions also contain Zn, the contents in Fe and Zn are jointly extracted in a first extraction step, the first organic extract obtained which is charged with $Fe^{3+}$, $Fe^{2+}$ and $Zn^{2+}$ is used for a renewed extraction of fresh solution wherein the $Fe^{2+}$-content of the first extract is exchanged for the $Zn^{2+}$-content of the fresh solution, and that the $Zn^{2+}$-content is separated from the second organic extract by stripping with acid. In particular, the renewed extraction is carried out at a pH value which is changed as compared to the pH value of the first extraction.

6 Claims, 1 Drawing Sheet

METHOD OF PROCESSING ACIDIC FE-CONTAINING SOLUTIONS

BACKGROUND OF THE INVENTION

The invention relates to a method of processing acidic Fe-containing solutions, in particular spent (discarded) pickling solutions, by means of liquid/liquid extraction with organic ion exchangers.

A method of processing spent treatment liquids containing Fe ions for materials containing metals or ores by liquid-Liquid extraction is known from EP-A 0 058 148. This method is directed to the recovery of inorganic acids free of metal ions and consists in first of all liberating the inorganic acids bound to the iron ions by means of a water-insoluble, liquid cation exchanger (for instance acidic phosphoric acid esters such as diethyl hexyl phosphate or dibutyl phosphate) binding the Fe ions. The free acids are subsequently extracted from the aqueous solution by adding an organic adduct-forming agent TBP (tributyl phosphate), DBBP (dibutyl benzyl phosphate), TOP (trioctyl phosphate, TOPO (trioctyl phosphine oxide) and the adducts are finally cleaved again, affording the pure acids.

Solutions of this type accumulate in an industrial scale and the problem posed consisted in providing a method permitting the processing of these solutions with a view to their content in Zn.

SUMMARY OF THE INVENTION

In order to solve this problem, the method according to the invention is mainly characterized in that from solutions also containing Zn, the content in Fe and Zn is jointly extracted in a first extraction step, the first organic extract loaded with $Fe^{3+}$, $Fe^{2+}$ and $Zn^{2+}$ thus obtained is used for a renewed extraction of fresh solution in which the $Fe^{2+}$ content of said first extract is exchanged for the $Zn^{2+}$ content of the fresh solution and that the $Zn^{2+}$ content is stripped from the second organic extract by mean of acid.

The renewed extraction is conveniently carried out at a pH value different from the pH value of the first extraction.

The second organic extract is stripped in particular by means of sulfuric acid, whereby a zinc sulfate solution is obtained.

According to a further characterizing feature of the invention, the second organic extract is, subsequent to stripping the $Zn^{2+}$ content therefrom, stripped again with an acid, conveniently hydrochloric acid, in order to also remove its $Fe^{3+}$ content.

If the acidic solutions show a high content of free acids, it may be convenient to subject them to diffusion dialysis prior to extraction in order to reduce their acid contents.

The invention is described in detail with reference to the accompanying drawing.

Figure 1:
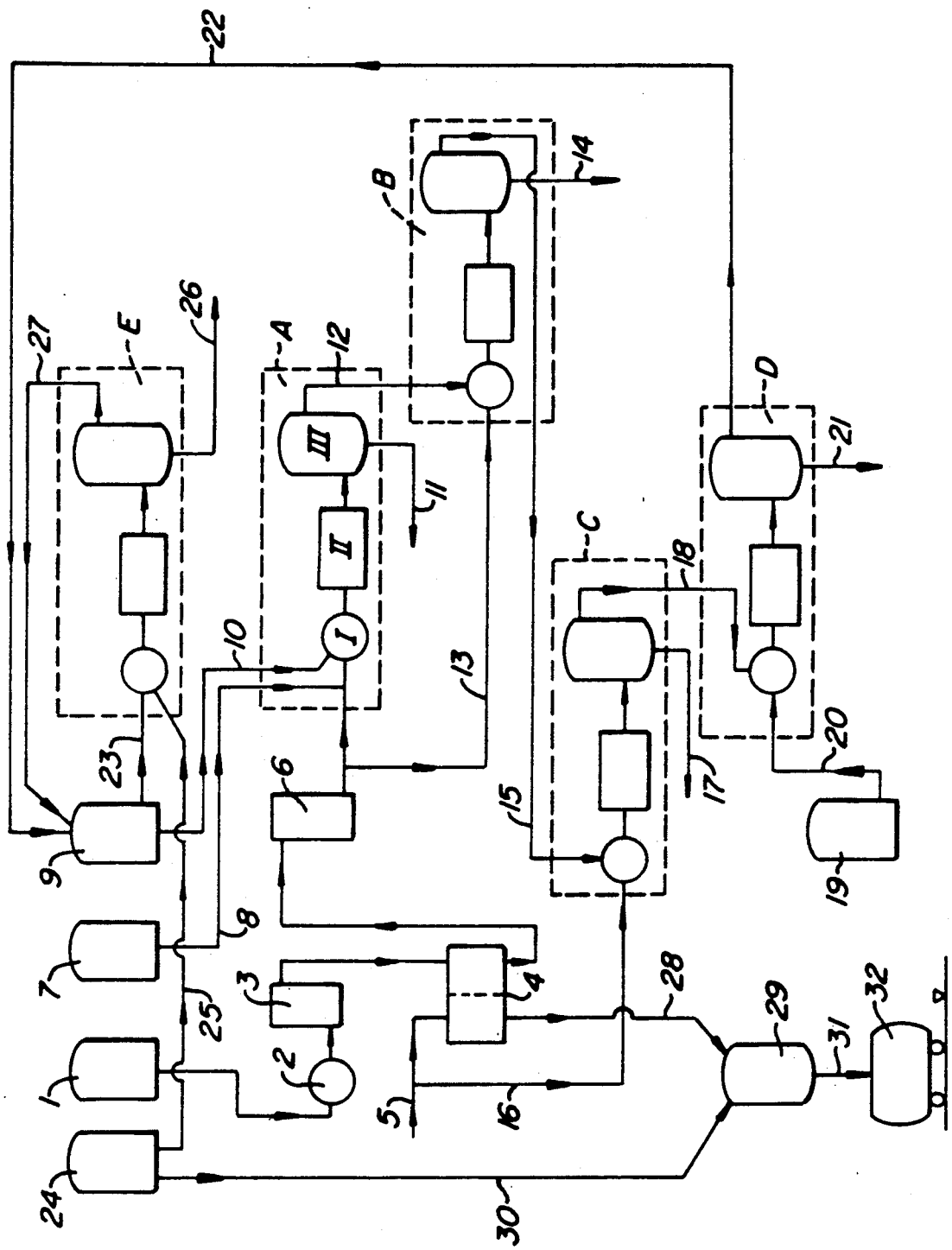
FIG. 1 shows a block diagram of a plant (system) for carrying out the method according to the invention.

Spent pickling solution containing hydrochloric acid, Fe and Zn is fed from a storage container 1 via a feed pump 2 and a filter 3 (for instance an activated carbon filter) to a dialyzer unit 4 wherein the solution is dialyzed against water supplied by the line 5 for reducing its content in free acid. The acid-depleted solution is then fed to an extraction stage A, consisting of a mixing pump I, a static mixer II and a settler III, via a tank 6 charged with Fe scrap mainly serving for the reduction $Fe^{3+}$ to $Fe^{2+}$, a coalescer (not represented) optionally being provided between static mixer and settler. Prior to entering the mixing pump, I, alkaline solution is metered into the solution from a solution storage container 7 via line 8 in order to adjust the pH value or pH value range required for the extraction. Metering is conveniently effected as a function of the pH value detected downstream from the mixing pump I. In the mixing pump I, an organic, water-immiscible extractant phase consisting in a manner known per se of an organic cation exchanger in an organic solvent is metered into this solution from a storage container 9 via line 10. Suitable cation exchangers are e.g. organic phosphor compounds, also as mixtures of metal-specific ion exchangers. A suitable solvent is e.g. kerosene.

The extractant phase may further contain, among others, solubilizers and stabilizers, e.g. isodecanol or other long-chained alcohols.

The concentration of the cation exchangers in the extractant phase conveniently ranges from 1 to 50 percent.

In the extraction stage A, which may comprise a plurality of steps e.g. in case of high metal concentrations, the ratio of solvent to cation exchanger in the extractant phase is adjusted so as to obtain an optimal depletion of the solution in Fe and Zn and a corresponding enrichment of Fe and Zn in the extractant phase. If necessary, the solution fed to the mixing pump I can be diluted with depleted solution.

From the settler III, an aqueous, depleted solution is withdrawn via line 11, on the one hand, and discarded as sewage unless it is needed for the said dilution.

On the other hand, the extractant phase charged with $Fe^{2+}$, $Fe^{3+}$ and $Zn^{2+}$ is withdrawn from the settler III and fed via line 12 to the mixing pump of a second extraction stage B set up according to the first extraction stage.

Fresh solution is further metered into the mixing pump of the second extraction stage B via the bypass line 13, alkaline solution (not represented) may further be metered into this solution like in extraction stage A for adjusting the required pH value or pH value range.

In the extraction stage B, the pH value is adjusted in such a manner that on the one hand, the $Zn^{2+}$ charge of the solution passes into the already charged extractant phase and on the other hand, the $Fe^{2+}$ charge of the extractant phase passes into the aqueous solution.

This means that on the one hand, an aqueous $FeCl_2$ solution which may e.g. be further used as an inorganic flocculant is withdrawn from the settler of the extraction stage B via line 14.

On the other hand, line 15 is used for withdrawing an extractant phase from the settler of extraction stage B, which is merely charged with $Fe^{3+}$ and $Zn^{2+}$ and is fed to the mixing pump of a further extraction stage C formed just like extraction stages A and B. In the extraction stage C, the extractant phase is washed free of chlorine ions by means of water supplied by lines 5 and 16. The washings are tapped from the settler of the extraction stage C via line 17 and the scrubbed extractant phase is fed via line 18 to the mixing pump of a further extraction stage D also set up like extraction stages A, B and C and wherein the extractant phase is stripped by means of sulfuric acid supplied from a storage container 19 via line 20. The sulfuric acid used is preferably one of 20 to 30 percent; the temperature in the extraction stage D can be above ambient temperature and be as high as about 60° C.

A zinc sulfate solution of commercial grade is tapped from the settler of the extraction stage D via line 21; the extractant phase now only charged with $Fe^{3+}$ is recycled to the extractant storage tank 9 via line 22, optionally following a further washing with water to remove sulfate ions.

In order to also remove the $Fe^{3+}$ from the extractant phase, a fifth extraction stage E is provided and again set up like extraction stages A to D; this stage is charged with extractant from the extractant storage tank 9 via line 23, on the one and, and with hydrochloric acid from a hydrochloric acid storage tank 24 via line 25, on the other hand. The hydrochloric acid concentration should amount to at least 6 N in order to strip out the $Fe^{3+}$ content From the settler of the extraction stage E, an $FeCl_3$ solution is tapped via line 26; the stripped extractant phase is recycled to the extractant storage tank 9 via line 27.

The hydrochloric acid accumulating in the dialyzer 4 is fed to a mixing tank 29 via line 28 and mixed in there with hydrochloric acid supplied from the hydrochloric acid storage tank 24 for forming a mixed acid which is charged into a tank vehicle 32 via line 31 and used e.g. as metal pickling.

The plant (system) represented and described offers the possibility of a complete and continuous treatment of an acidic solution containing Fe and Zn. The following example illustrate the practical results obtained using the method of the present invention:

EXAMPLE

A discarded pickling solution was filtered clear and containing 56 g/l Zn, 85 g/l Fe and 4 percent hydrochloric acid. 100 l of this solution were charged into extraction stage A, the pH value was adjusted to 5 with 20 percent NaOH and extraction was carried out by means of 1000 l of a 20 percent solution of di-2-ethylhexyl phosphate (Hostarex PA 216) in kerosene. The aqueous solution withdrawn from the settler of extraction stage A shows a residual content of about 20 ppm of Zn and about 760 ppm of Fe., at a pH value of 4, these values range from about 580 ppm of Zn to about 1430 ppm of Fe. The first extract obtained from extraction stage A shows a charge of about 14 g/l of metal, of this 0.42 g/l of $Fe^{3+}$.

The first organic extract was charged together with 170 l of discarded pickling solution to extraction stage B and extracted at a pH value of 1.4. The $FeCl_2$ solution withdrawn from the settler of the extraction stage contained 137.4 g/l of Fe and 0.6 g/l of Zn.

The second organic extract was washed in extraction stage C with 300 l of water which had been made acidic by means of $H_2SO_4$ to a pH value of 1.4, the aqueous phase being circulated.

The scrubbed second extract was subsequently stripped in extraction stage D by means of 120 l of 25 percent $H_2SO_4$; the aqueous stripping solution was again circulated. A $ZnSO_4$ solution with a content of 124.5 g/l of Zn and 5 ppm of Fe was withdrawn from the settler of extraction stage D.

The invention is not limited to the embodiment represented and described. For instance given type of extraction system (such as columns) may be used. Further, it would be possible to operate without dialyzer and without Fe scrap tank. By the same token, it would be possible to vary the concentration of the $ZnSO_4$ solution obtained, although it conveniently ranges from 100 to 200 g/l of Zn, and the process parameters of the individual steps, which depend on the type of extractants used.

It would further be possible to provide each extraction stage, which may comprise one or a plurality of steps within itself, independently of one another, with means for metering of acid, alkaline solution, fresh extractant and other additives.

I claim:

1. A method of processing acidic solutions including Fe and Zn by liquid/liquid extraction, the method comprising:

extracting a first fresh portion of a solution comprising $Fe^{3+}$, $FE^{2+}$, and $Zn^{2+}$ in a first extraction stage with an extractant phase comprising an organic ion exchanger and an organic solvent, thereby obtaining a first organic extract charged with $Fe^{3+}$, $Fe^{2+}$, and $Zn^{2+}$;

extracting a second fresh portion of solution comprising $Fe^{3+}$, $Fe^{2+}$, and $Zn^{2+}$ in a second extraction stage with the first organic extract, whereby the $Fe^{2+}$ content of the first organic extract is exchanged for $Zn^{2+}$ content of the fresh solution, thereby obtaining a second organic extract charged with $Fe^{3+}$ and $Zn^{2+}$; and stripping the $Zn^{2+}$ from the second organic extract with acid to form a substantially a $Zn^{2+}$-free extract.

2. The method according to claim 1, wherein the step of extracting a second fresh portion of solution is carried out at a pH value which is lower than the pH value of the extraction of the first fresh portion of solution.

3. The method according to claim 1, wherein the second organic extract is stripped by sulfuric acid.

4. The method according to claim 1, further comprising stripping the $Zn^{2+}$-free extract with acid for separating the $Fe^{3+}$ from the $Zn^{2+}$-free extract.

5. The method according to claim 4, wherein the stripping of the $Zn^{2+}$-free extract is carried out with hydrochloric acid.

6. The method according to any one of the claims 1-5, wherein both the first and second fresh solutions are subjected to a diffusion dialysis prior to both the first and second extraction stages in order to reduce their acid contents.

* * * * *